(12) United States Patent
Kahlow

(10) Patent No.: US 11,893,593 B2
(45) Date of Patent: Feb. 6, 2024

(54) SALES PREDICTION SYSTEMS AND METHODS

(71) Applicant: 6SENSE INSIGHTS, INC., San Francisco, CA (US)

(72) Inventor: Amanda Kahlow, San Francisco, CA (US)

(73) Assignee: 6SENSE INSIGHTS, INC., San Francisco, CA (US)

( * ) Notice: Subject to any disclaimer, the term of this patent is extended or adjusted under 35 U.S.C. 154(b) by 0 days.

(21) Appl. No.: 17/470,987

(22) Filed: Sep. 9, 2021

(65) Prior Publication Data
US 2022/0067760 A1 Mar. 3, 2022

Related U.S. Application Data

(63) Continuation of application No. 16/660,466, filed on Oct. 22, 2019, now Pat. No. 11,127,024, which is a (Continued)

(51) Int. Cl.
*G06Q 30/0202* (2023.01)
*G06Q 30/0242* (2023.01)
(Continued)

(52) U.S. Cl.
CPC ..... *G06Q 30/0202* (2013.01); *G06Q 30/0246* (2013.01); *G06Q 30/0256* (2013.01); *G06Q 30/0271* (2013.01); *H04L 67/535* (2022.05)

(58) Field of Classification Search
CPC .......... G06Q 30/0202; G06Q 30/0246; G06Q 30/0256; G06Q 30/0271; H04L 67/535
See application file for complete search history.

(56) References Cited

U.S. PATENT DOCUMENTS 6,070,160 A * 5/2000 Geary ................. G06F 16/2468
707/999.005
6,460,036 B1 * 10/2002 Herz ................... H04N 21/4755
348/E7.071
(Continued)

FOREIGN PATENT DOCUMENTS

JP 2004527019 A * 9/2001
WO 2007112411 A2 10/2007

OTHER PUBLICATIONS

Choi et al. "Predicting the Present with Google Trends" (2011) (https://people.ischool.berkeley.edu/~hal/Papers/2011/ptp.pdf) (Year: 2011).*

*Primary Examiner* — Sujay Koneru
(74) *Attorney, Agent, or Firm* — Procopio, Cory, Hargreaves & Savitch LLP

(57) ABSTRACT

Computer implemented sales prediction system collects data relating to events of visitors showing an interest in a client company from plural data sources, an organization module which organizes collected data into different event types and separates collected event counts in each event type between non-recent and recent events occurring within a predetermined time period, a first processing module which periodically calculates weighting for each event type based on recent and non-recent events for the event type compared to totals for other selected event types, a second processing module which periodically calculates sales prediction scores for each visitor and companies with which visitors are associated based on accumulated event data and weighting, and a reporting and data extract module which is configured to detect variation in sales prediction scores over time to identify spikes which can predict upcoming sales and to provide predicted sales information and leads to the client company.

19 Claims, 9 Drawing Sheets

Related U.S. Application Data continuation of application No. 14/919,093, filed on Oct. 21, 2015, now Pat. No. 10,475,056, which is a continuation of application No. 13/762,041, filed on Feb. 7, 2013, now Pat. No. 9,202,227.

(60) Provisional application No. 61/595,819, filed on Feb. 7, 2012.

(51) Int. Cl.
*G06Q 30/0251* (2023.01)
*H04L 67/50* (2022.01)

(56) References Cited

U.S. PATENT DOCUMENTS

| | | | |
|---|---|---|---|
| 6,959,281 B1* | 10/2005 | Freeling | G06Q 30/0203 705/64 |
| 7,085,682 B1 | 8/2006 | Teller et al. | |
| 7,349,827 B1 | 3/2008 | Heller et al. | |
| 7,620,655 B2 | 11/2009 | Larsson et al. | |
| 7,689,456 B2 | 3/2010 | Schroeder et al. | |
| 7,725,346 B2 | 5/2010 | Gruhl et al. | |
| 7,991,640 B2 | 8/2011 | Shapira et al. | |
| 8,234,148 B2 | 7/2012 | Shapira et al. | |
| 8,244,714 B1 | 8/2012 | Collins et al. | |
| 8,412,847 B2 | 4/2013 | Longo | |
| 8,417,557 B2 | 4/2013 | Shapira et al. | |
| 2002/0099598 A1* | 7/2002 | Eicher, Jr. | G06Q 10/06 705/28 |
| 2002/0099611 A1* | 7/2002 | De Souza | G06Q 30/0601 705/26.1 |
| 2002/0138333 A1 | 9/2002 | DeCotiis et al. | |
| 2002/0169657 A1 | 11/2002 | Singh et al. | |
| 2002/0169658 A1* | 11/2002 | Adler | G06Q 10/06 705/7.29 |
| 2007/0027741 A1 | 2/2007 | Gruhl et al. | |
| 2007/0124194 A1* | 5/2007 | Barnette, Jr. | G06Q 30/02 705/14.54 |
| 2007/0156382 A1 | 7/2007 | Graham et al. | |
| 2008/0248815 A1* | 10/2008 | Busch | H04L 67/52 455/456.5 |
| 2008/0255935 A1 | 10/2008 | Madhavan et al. | |
| 2008/0270471 A1* | 10/2008 | Schon | H04L 67/535 |
| 2008/0306830 A1* | 12/2008 | Lasa | G06Q 30/02 707/999.1 |
| 2009/0076884 A1* | 3/2009 | Johnson | G06Q 30/0202 705/320 |
| 2009/0234710 A1* | 9/2009 | Belgaied Hassine | G06Q 30/0201 705/7.29 |
| 2009/0234711 A1* | 9/2009 | Ramer | G06Q 30/0269 705/14.66 |
| 2009/0298483 A1* | 12/2009 | Bratu | G06Q 30/02 705/14.67 |
| 2010/0036643 A1 | 2/2010 | Marvasti et al. | |
| 2010/0063870 A1 | 3/2010 | Anderson et al. | |
| 2010/0287029 A1 | 11/2010 | Dodge et al. | |
| 2011/0077977 A1* | 3/2011 | Collins | G06Q 40/08 707/755 |
| 2011/0313813 A1 | 12/2011 | Kolandaiswamy et al. | |
| 2012/0036037 A1 | 2/2012 | Xiao et al. | |
| 2012/0158450 A1* | 6/2012 | Ulwick | G06Q 30/0202 705/7.31 |
| 2012/0158461 A1 | 6/2012 | Aldrey et al. | |
| 2012/0166628 A1* | 6/2012 | Kullos | H04L 12/185 709/224 |
| 2012/0203639 A1* | 8/2012 | Webster | H04L 67/306 705/14.66 |
| 2012/0271691 A1* | 10/2012 | Hammad | G06Q 30/02 705/14.17 |
| 2012/0278091 A1* | 11/2012 | Yaseen | G06Q 30/02 705/1.1 |
| 2013/0091065 A1* | 4/2013 | Telehowski | G06Q 50/18 705/310 |
| 2013/0138507 A1* | 5/2013 | Kumar | G06Q 30/0251 705/14.54 |

* cited by examiner

SALES PREDICTION SYSTEMS AND METHODS

CROSS-REFERENCE TO RELATED APPLICATIONS

The present application is a continuation of U.S. patent application Ser. No. 16/660,466, filed on Oct. 22, 2019, which is a continuation of U.S. patent application Ser. No. 14/919,093, filed on Oct. 21, 2015, which is a continuation of U.S. patent application Ser. No. 13/762,041, filed on Feb. 7, 2013, which claims priority to U.S. Provisional Patent App. No. 61/595,819, filed on Feb. 7, 2012, which are all hereby incorporated herein by reference as if set forth in full.

BACKGROUND

Field of the Invention

The present invention relates generally to a system and method of predicting future sales, leads, and opportunities based on information gathered from multiple sources.

Related Art

Analytic systems and lead scoring methods are known which score levels of engagement, but these generally do not predict sales. They also only use past purchase history of known contacts only. They do not score companies levels of engagement or likelihood to purchase. All is done at the known contact level. In some cases, only limited sources are used for prediction purposes. For example, U.S. Pat. No. 7,725,346 uses online public discussions to predict sales. They also do not score (or predict) what products or services companies will purchase.

SUMMARY

Embodiments described herein provide for a sales prediction system and method which looks for various types of interactions from multiple channels of data in order to predict possible future sales.

According to one embodiment, a computer implemented sales prediction system is provided which comprises a non-transitory computer readable medium configured to store computer executable programmed modules, a processor communicatively coupled with the non-transitory computer readable medium and configured to execute programmed modules comprising a data management module which collects data relating to activities of known or unknown visitors activities to one or more client companies from plural data sources, an organization module which organizes collected data into different event types and separates the collected event counts in each event type between recent events and non-recent events, a first processing module which periodically systematically and automatically calculates weighting for each event type and each action or response taken based on recent events and non-recent events for the event type compared to totals for other selected event types or actions or responses taken, a second processing module which periodically calculates sales prediction scores for each visitor and for each company (all visitors from that company) based on the accumulated event data and weighting, and a reporting module which is configured to detect variation in sales prediction scores over time to identify spikes (increases in scores compared to previous periods of time) which can predict upcoming sales and opportunities and to provide predicted sales and marketing information to each client company.

The term "visitors" includes both known individuals or contacts and unknown individuals, and the visitors may be independent individuals or may be associated with companies which may be predicted to make purchases in the future, based on activity levels. The actions of all "visitors" associated with a particular company are considered together to predict the likelihood of a future purchase by the associated company. The "visitor activity" includes actions of all types of visitors to the client company, its website, and identified interest following marketing activities such as targeted emails and the like. A visitor is identified in various ways, including IP look up services to identify the IP address for visitors over the Internet, followed by mapping of the IP address to domains and associated companies. "Recent" events are events in a predetermined current time period, such as the last X days. Types of visitor activity detected prior to previous sales (for the same and other similar companies) can be a powerful predictor of future sales.

In one embodiment, the system first uses collected data regarding visitor activity of one or more companies that have purchased from the client company in the past to calculate a sales predictive model. The model includes the predictive value or weighting for each activity as a sales predictor based on prior sales to the known company or companies, and this model is then used when calculating sales prediction scores for other visitors and visitor companies to the client company. In other words, this system uses past purchase behavior of companies to predict when other companies might buy in the future In another aspect, a computer implemented method for predicting future sales to company visitors is provided, in which data on company visitor activity is collected via standard means or visitor data from plural data sources or channels, including sales data, online chat and social media, company website search log files, web log files, website tags, customer relationship management systems, and e-mail marketing data, and the collected data is organized into different event types and the collected event counts are separated between recent events and non-recent events, following analyzing the collected and organized data by calculating weighting for each event type as a sales predictor based on other companies buying and behavior prior to buying, and recent events and non-recent events for the event types compared to other event types, calculating sales prediction scores based on the accumulated event data and weighting, and creating reports and extracts of data which track the variation in calculated sales prediction scores over time and identify spikes in the sales prediction score for visitors as well as companies with which the visitors are associated, which can then be used for marketing purposes.

Spikes or increases in the calculated sales prediction scores using this system and method have been found to be a statistically accurate predictor of upcoming sales increases, and the scores are also useful in identifying potential leads for marketing purposes.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a system and method for predicting future sales, leads and opportunities based on monitoring and analyzing data relating to specific visitors and their companies in order to create sales prediction scores.

After reading this description it will become apparent to one skilled in the art how to implement the invention in various alternative embodiments and alternative applications. However, although various embodiments of the present invention will be described herein, it is understood that these embodiments are presented by way of example only, and not limitation.

In the following description, the term "client company" means a company using the system and method described below to predict future sales of their products or services and to provide marketing insight, marketing leads, and sales opportunities and sales leads, the term "visitor" means individuals (known individuals or contacts and unknown individuals) which make contact with the client company or engages in activity with the client companies' digital channels or show interest in the client company in one or more of multiple different ways and which may purchase from the client company in the future. Visitors may be independent individuals or may be found to be associated with companies, i.e. visitor companies, where the term "visitor company" means a company with which one or more visitors are associated. The term "Indicator" or "visitor event" means a detected event or activity initiated by a visitor which relates to the client companies' products or services sold. Such events cover a large number of different possible event types, including doing a search on a company web site, doing a search on a search engine such as Google, looking at identified pages on the website, clicking on a company ad, opening a marketing e-mail, filling out a company information form, mentioning the company on on-line chat or social networks, contacting the company on the company chat page or social network activity, attending a company trade show, seminar, presentation or any detectable company related event, and may include both web data and offline interaction data provided in client company data files, as discussed in more detail below.

Figure 1:
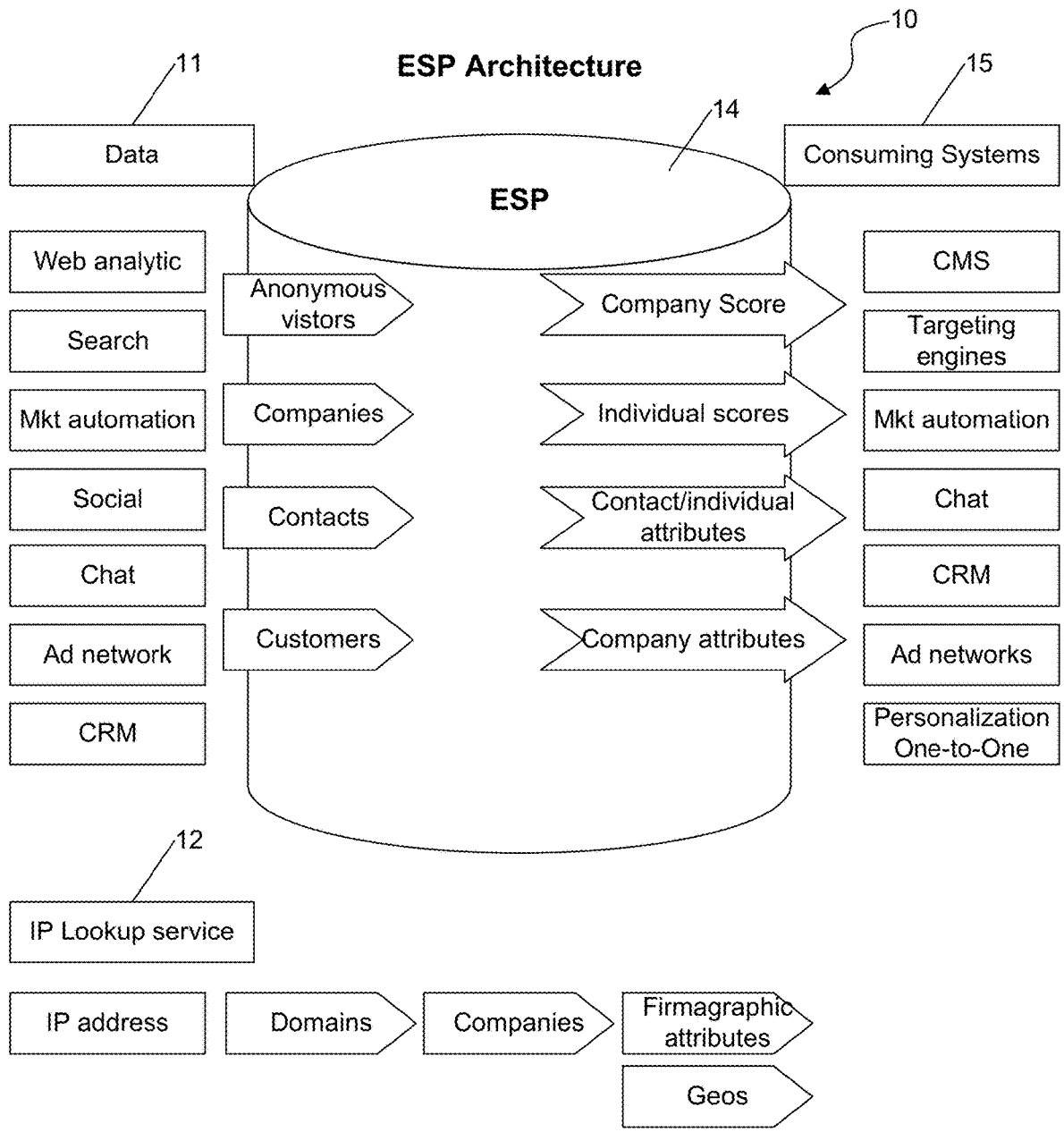
FIG. 1 is a block diagram of one embodiment of a sales prediction system.
Figure 2:
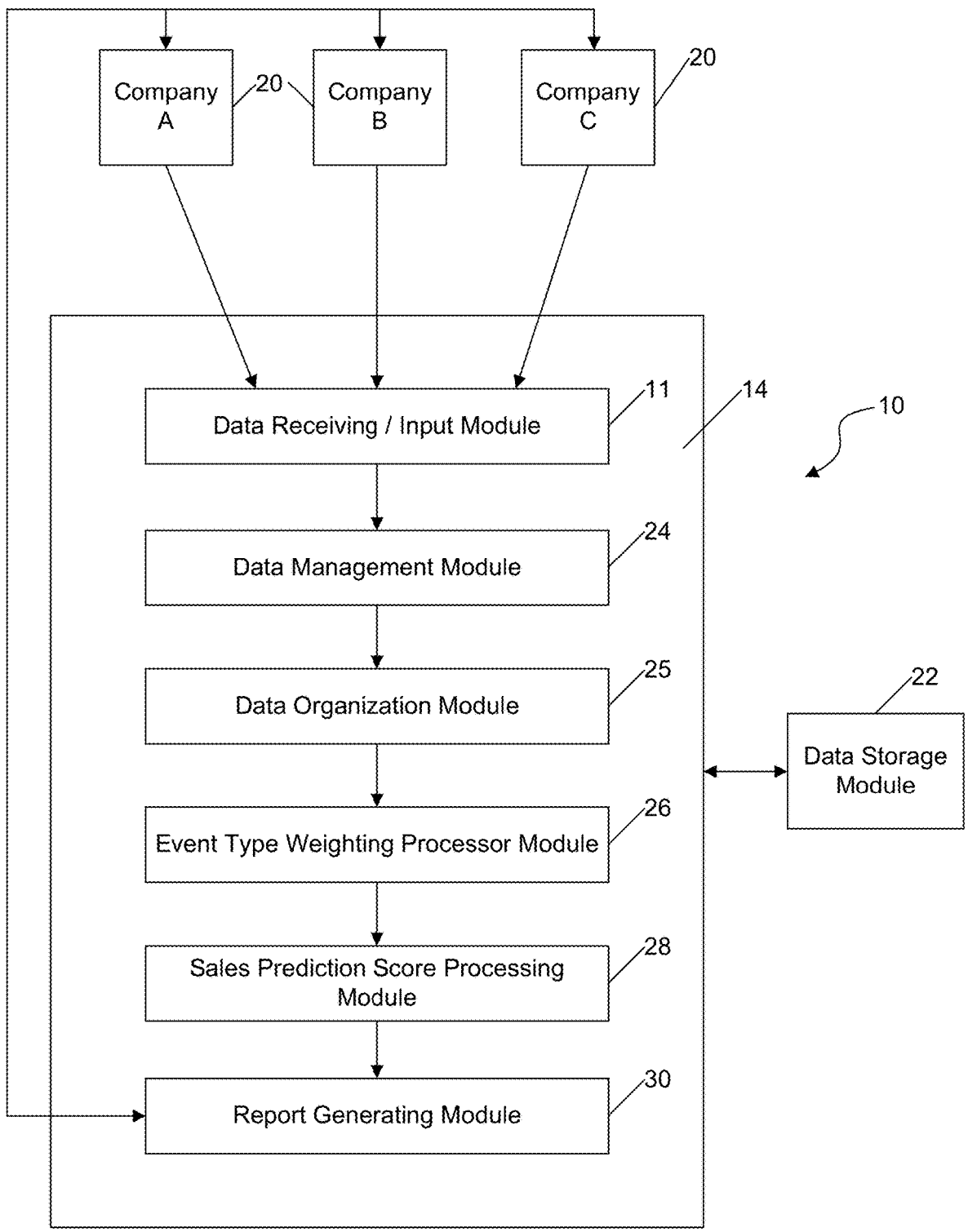
FIG. 2 is a block diagram illustrating the system architecture in more detail.

FIGS. 1 and 2 are block diagrams illustrating one embodiment of a computer implemented sales prediction system 10 in which one or more processors are programmed with a non-transitory computer readable medium in order to carry out the steps described below. This system and method may be used to predict upcoming sales increases and also as a marketing tool to develop new customer prospects, contacts, and sales opportunities.

System 10 collects multiple channels of visitor activity data and/or communication data, such as the types of data 11 listed on the left hand side in FIG. 1, relating to a particular client company or multiple client companies, and then scores visitors of the client company detected in the activity data, including both individuals and companies, in order to determine the following for each detected individual visitor and for each company visitor as a whole (taking into account all individual visitor activities found to be associated with a company):

1. The likelihood to purchase.
2. How far along in the sales cycle the prospective customer (company or individual) is. Are they in the early stage of buying or late stages?
3. What products/services/technologies (goods sold) companies are interested in buying.
4. Who they are— D&B company firmagraphic attributes (vertical, geography, size of business, industry, annual revenue, etc.).

The collected data may include, but is not limited to, web visiting data, call data, customer relationship management (CRM), ad network, email, campaign, search, social, marketing automation, chat, etc. The detected contact entities or visitors may be anonymous prospective customers or known prior customers or contacts. As illustrated in FIG. 1, the system also uses an IP lookup service 12 such as DemandBase to look up IP addresses, identify domain names and the associated companies, and to obtain and store firmagraphic attributes and geographical information on the detected new company, for later distribution to the particular client company for which the data is being collected. The collected data is processed in processing system or central processor 14 according to the software program instructions to produce various types of sales prediction reports and data extracts which are transmitted to consuming systems 15 of the client companies, such as CMS (customer management systems), prospect targeting engines, marketing automation systems, chat, CRM, ad networks, and personalization one-to-one systems.

As illustrated in FIG. 2, the sales prediction system 10 may generate sales prediction information as illustrated in FIG. 1 for a plurality of different client companies 20, such as company A, company B, company C, etc., as illustrated in FIG. 2. Each client company 20 provides data files to the data input module 11 of computer or processor 14. The files may include activity data, communication data, and/or other data. The system may also be programmed to load third party client company specific data or data about the client companies' relative products or services over the Internet, for example from social network sources and other sources.

The collected data files are stored in data storage module 22 and are also provided to data management module 24. In one embodiment, up to billions or more of rows of granular record level data and supplementary lookup attribute data (i.e. other data such as campaign and cost data) may be loaded from any one or more of the following data sources of the respective client companies, with separate storage and processing of data for each of the client companies being handled:

1. Sales and bookings Data (such as SalesForce, Sibel)
2. Web log files (raw server logs)
3. Web site tags (such as SiteCatalyst, or Webtrends)
4. Registration data 5. Customer Relationship management systems
6. Marketing Automation systems—Lead data
7. Social media data
8. Search log files
9. Online interactive Chat data (such as LivePerson)
10. Campaign spend data
11. Campaign lookup data
12. Ad network data (such as Doubleclick, Atlas)
13. IP to company lookup sources (such as Demandbase)

The system is designed to handle terabytes of data, so there is little or no limitation on the number of data sources which may be used or how much data can be loaded. The data is loaded into the data management module 24. In one embodiment, this module uses a multi-channel analytic engine such as Adobe Insight or Hadoop, but other databases may be used for this purpose in other embodiments.

The above data sources are connected via multiple keys. Keys include but are not limited to: web Cookies, contact ids, IP address, DUNS number, company name/address and country code matching. All data is connected at every level where there is a possible connection. All data is stored at the most granular level. Nothing is pre-aggregated. This allows the processing system to see and analyze indicators prior to buying in order to perform the analysis described below.

The data is first organized and dimensionalized in data organization module 25. Standard extract, transform and load (ETL) processes such as those provided in Adobe® Insight, Hadoop or others may be used to used to create dimensions out of the raw data. These dimensions are then sorted into action "Indicators" in event type weighting module 26. This is where the predictive model begins. Indicators are at two levels, specifically category indicators and element level indicators. Thus, each individual element type has an individual indicator, for example, viewing of a specific web marketing page on the client company website and is also assigned to a "category" indicator, which in this case is "viewed a web marketing page", i.e. a count whenever any of the company's web marketing pages is viewed. Thus, each detected indicator or contact event is assigned to the specific individual indicator and category indicator in data storage.

There may be many 'category' indicators (hundreds in some cases, less in others) for each channel of data. For example in the web channel, a few indicators would be: viewed a web marketing page, started a session on a web marketing page, watched a video, downloaded a white paper or pdf document, clicked to the partner locator tool, etc. Email category indicators include opening an email, responding to the email offer, etc. The processor also evaluates hundreds of thousands (millions) of element level indicators. Examples of element level indicators are each individual page on a website, each video on the site, each white paper, each email offer, each banner offer, each click event, etc.

Each category indicator and individual element level indicator is assigned a weighting by weighting processor module as described in more detail below. The system does not arbitrarily weight these indicators as is the case with some prior art sales prediction scoring engines. Instead, weighting is assigned based on linking stored visitor behavior to later sales data in the clients' CRM systems, making this system a more accurate predictor of potential future sales. As noted above, data is connected in the database by common keys. Sales data for visitor companies such as business to business (B2B) companies is stored by company IDs, commonly a D&B DUN's number (or company name/address/country code). Anonymous visitor activity is connected by IP address to their companies using Demandbase (or other similar vendor) lookup files, or to anonymous individual contacts. The system can therefore identify, for example, billions of interactions from unknown visitors and derive an interaction behavior to later sales data in CRM systems. In other words, the system looks for companies that have purchased in the past then calculates the weighting based on what they did prior to buying. This is then used to locate other companies showing similar behavior patterns in order to predict future sales and identify new leads and sales opportunities.

Statistical methods may be used in order to determine the element level and category indicator weights for an initial sales predicting model for each new client company. This method looks at companies that have purchased from the client company in the past, what actions did those companies take prior to buying, and in what order and what % of their overall actions? Actions that show a stronger relationship to buying are thereby weighted higher than those that do not show a relationship to a later purchase. When other new visitors exhibit similar behavior, the system predicts that they too are getting ready to buy. The new visitors may be associated with companies or may be independent individuals, i.e. individuals for which no link is found to a company. The term "visitor company" means a previously known or unknown company with which one or more visitors are associated.

Unlike other models, the sales predictions produced by this system are all based on relative increases (spikes) in scores over time per visitor company. The system produces a sales prediction score as described in more detail below. If a small visitor company has say a low score of 5 one month, and then goes up to a significantly higher score 50 in the following month, this indicates a 10× increase month over month. The system predicts that this company is going to purchase 10× more than they have in the past. If their average booking was previously $1000 a month, the system predicts they are going to buy $10,000 (10× increase). If a large visitor company say has an average monthly score of 100 then increases to 1000, the system predicts they are going to buy 10× more than they have in the past. In this case, if their average booking was $100,000 a month, the system predicts that they are going to buy $1,000,000 in future months.

The following is one example of a weighting technique used to create an initial sales predictive model. Each category and individual element or indicator is weighted based on overall counts by any dimensions in order to create the initial sales predictive model. Using the web source Page dimension as an example, one conversion point might be a count of web pages of a client company website visited by visitors prior to a sale, as indicated in the example below.

Example of Weighting Calculation for an Event

Event=Pages Visited before a SALE (or other conversion point can be used).

In this case, the weighting for each page is P1/PT, where P1 is the number of times a page was visited before sale and PT is the total number of all website pages visited before the sale. This is calculated below for an example of two visitors to a website, where history indicates that several pages were visited, followed by a sale, i.e. a purchase by that visitor. The visitors may be associated with a known contact, may be associated with a known company or just scored as an unknown visitor not connected to a contact or company.

Visitor 1
PAGES: A→B→A→C→E→D→SALE
A 1 1
B 1
C 1
D 1
E 1
TOTAL PAGES before sale=6
WEIGHT Calculation per PAGE:
A=2/6=0.33
B=1/6=0.17
C=1/6=0.17
D=1/6=0.17
E=1/6=0.17
Visitor 2
PAGES: A→A→H→C→H→B→D→E-→A→B→C→K→SALE
TOTAL PAGES=11
WEIGHT Calculation per page visited:
A=3/11=0.27
B=2/11=0.18
C=2/11=0.18
D=1/11=0.09
E=1/11=0.09
H=2/11=0.18
K=1/11=0.09
TOTAL PAGE CALCULATION for 2 VISITORS
A=(0.33+0.27)/2=0.3
B=(0.17+0.18)/2=0.175
C=(0.17+0.18)/2=0.175
D=(0.17+09)/2=0.13
E=(0.17+0.09)/2=0.13
H=0.18/1=0.18
K=0.09/1=0.09

Other examples of methods for performing the weighting include machine learning statistical methods such as but not limited to decision trees, logistic regression, and linear regression.

Activities of any number of visitors may be used to determine weightings based on past sales. For example, weights may be produced from one sales transaction or two or more sales transactions (in which case, the weights for multiple sales transactions may be average weights). The weightings by event and by event category are then stored and used to calculate sales predicting scores for other visitors and visitor companies based on activities similar to those of other visitors prior to a sale. The predictive model may be periodically updated using new sales information and activities prior to sales.

In some implementations, weights may be computed and/or produced in associated with one or more products or services. For example, generating weights from historic data associated with the one or more products or services.

In one embodiment, the system may be programmed to double the value of an action/indicator count if the indicator was a "recent" event, where "recent" means within a certain current recent time window. The recency flag can be set to any time window, for example within the last seven days, or a shorter or longer period. In other words, a page visited one time, where the visit happened recently, is given a count of 2 for the recent visit. A sales prediction score Q is then calculated in processing module 28 by multiplying each element count by the calculated predictive weighting for that element, and calculating the total score for all elements, as follows:

Sales Prediction Score Q=(A element count*A weight)+(B element count*B weight)+(C element count*C weight)+(D element count*D weight)+(E element count*E weight)+(H element count*H weight)+(K element count*K weight)+(A element recent count*A weight)+(B element recent count*B weight)+(C element recent count*C weight)+(D element recent count*D weight)+(E element recent count*E weight)+(H element recent count*H weight)+(K element recent count*K weight).

In other words, Q=(CX+RX)*weight, where CX is the raw count or total number of times the indicator has been hit, and RX is the recent count. Thus, each recent count is counted twice, one in the raw count, and once in the recent count. Target scoring can be done for visitors who are individuals and companies, to indicate the likelihood of purchasing any client company product or a specific product, service or technology. The following example is for a client company (ABC Company) which has two product lines, specifically printers and tablet computers:

ABC Company Scores:

Q Score (Likely to purchase): 155

Printer interest score: 33

Tablet interest score: 120

Individual Y Scores:

Likely to purchase score: 35

Printer interest score: 0

Tablet interest score: 400

In this case overall scores are calculated, along with Q scores for visitor or company activities associated with the specific product lines.

Table 2 below is an example of an individual cookies calculation only at the category level (for simplicity of explanation). The sales estimate processing system and method carries out the calculations of weighting and sales prediction scores at both the category and element level. A lookup file is used to load the element weights back into date management/data organization modules and the calculations are done for rows of unique indicator elements (e.g., up to billions or more rows). The final column is the Score or Q=(Non-recent count+(Recent count*2))*W (where W=weight), with total Q=504.3.

TABLE 2

| | Weights | Normalized | Non-Recent Activity | Recency: Did the visitor show interest in the last (7) days? | |
|---|---|---|---|---|---|
| Reach: CampaignAd | 1.0 | 0.5% | 1 | 1 | 3 |
| Reach: SearchEngineToWM | 1.0 | 0.5% | | | 0 |
| Reach: SocialMediaToWM | 1.0 | 0.5% | | | 0 |
| Reach: WMCiscoSearch | 2.0 | 1.0% | | | 0 |

TABLE 2-continued

|  | Weights | Normalized | Non-Recent Activity | Recency: Did the visitor show interest in the last (7) days? |  |
| --- | --- | --- | --- | --- | --- |
| Reach: WMLandingPage | 1.0 | 0.5% |  |  | 0 |
| Usage: WMPages | 1.0 | 0.5% | 5 | 3 | 11 |
| Usage: AdjWMPages | 0.1 | 0.1% | 5 | 3 | 1 |
| Usage: NonWMPages | 0.2 | 0.1% | 5 | 3 | 2 |
| Usage: Logins | 0.0 | 0.0% | 5 | 3 | 0 |
| Usage: MobilePages | 1.0 | 0.5% | 5 | 3 | 11 |
| Content: CompleteVideo | 5.0 | 2.6% | 5 | 3 | 55 |
| Content: VideoPlay | 5.0 | 2.6% | 5 | 3 | 55 |
| Content: WMEndofTree | 5.0 | 2.6% | 5 | 3 | 55 |
| Content: CPRRegister | 5.0 | 2.6% |  |  | 0 |
| Content: DiscussionForums | 5.0 | 2.6% |  |  | 0 |
| Content: GistComplete | 20.0 | 10.5% | 1 | 1 | 60 |
| Content: Keycode | 7.0 | 3.7% | 1 | 1 | 21 |
| Content: MyCisco | 5.0 | 2.6% |  |  | 0 |
| Content: News | 1.0 | 0.5% |  |  | 0 |
| Content: OreoClick | 10.0 | 5.2% |  |  | 0 |
| Content: Podcast | 5.0 | 2.6% |  |  | 0 |
| Content: RSSReadClicks | 7.0 | 3.7% |  |  | 0 |
| Content: RSSSubscribers | 5.0 | 2.6% |  |  | 0 |
| Content: SocialSharing | 7.0 | 3.7% |  |  | 0 |
| Content: ThreeDModel | 6.0 | 3.1% |  |  | 0 |
| Connection: BuyNow | 20.0 | 10.5% |  |  | 0 |
| Connection: Chat | 15.0 | 7.8% | 2 | 2 | 90 |
| Connection: Email | 10.0 | 5.2% | 2 | 2 | 60 |
| Connection: PartnerLocator | 20.0 | 10.5% |  | 1 | 40 |
| Connection: RequestPrice | 20.0 | 10.5% |  | 1 | 40 |
| Total |  | 100.0% | 47 | 33 | 504.3 |

The resultant sales prediction scores are stored for individuals (cookies, contact ids) and by visitor company (name, DUNS number), so that sales personnel can follow up on promising sales leads and marketing tools and engines can target that visitor (individual or company) with a targeted message. A total sales prediction score for a particular visitor (individual or company) can be tracked over time using the above calculation, with periodical updates of counts, as well as updates of weighting based on counts in categories or individual contact events. Updates are not connected to booking but are performed periodically regardless of sales or bookings.

A similar methodology is used to determine what product category and what individual product an individual or company is interested in and is likely to buy. The above method is followed to calculate scores, however indicators are only used if they map to a particular product or product category. For example, if scores are being scored for say Laptops for an IT company, the score is based only on pages and videos and events that relate to the product topic.

The accumulated estimated sales prediction scores for companies and individuals showing interest in a client company over time are stored in database 22 and then converted into various reports and data extracts by report generating module 30. Reports and data extracts are communicated to various downstream systems of the respective client companies 20, as indicated in FIGS. 1 and 2. Scores may be extracted at the individual/contact level or at the company level. Extracts are sent to the client company's content management and web or demand generation personalization systems, marketing automation systems, CRM platforms, sent directly as alerts to sales representatives, and so on. Alerts may be sent in the event of a detected spike in scores for a particular visitor, product line, or product, for appropriate follow up by company personnel. The downstream use cases for sales and marketing are numerous. The foregoing method is carried out periodically for each client company to provide them with sales prediction scores.

FIGS. 3 to 6 illustrate some graphical examples of reporting the tracked contact scores for small, mid-size, and large visitor companies interacting with a client company. The client companies these are built for are all B2B companies with an average of 6 to 12 month sales cycles. The X axis in FIGS. 3 to 6 represents time by month, while the left hand vertical axis represents total sales and the right hand vertical axis is the calculated sales prediction score or Q for the visitor company, calculated as explained above. The visitor company scores are based on events initiated by one or more "visitors" to the client company which are associated with the visitor company. The vertical bars represent the monetary amount of purchases or bookings made by the company, while calculated scores over time are shown as data points and are connected by the score line. It has been found that the score line spikes up prior to a booking, with the size of the spike predicting the relative future booking amount or dollar value. The scores may be calculated at different time intervals depending on the type of business in which the company is involved. In the illustrated examples, the client companies for which contacts are being tracked are B2B companies with 6-12 month sales cycles, so the scores are calculated monthly, and the expectation is that a score spike might be expected 3-12 months prior to the booking. A spike in the calculated score is a relatively good predictor of a booking to come, while the size of the spike provides an indication of the size of the future booking, as seen by the arrowed lines between a spike and a subsequent booking in FIGS. 3 to 6.

In FIGS. 3 to 6, each of the visitor companies being scored is a prospective customer of the client company, say visitor companies 1, 2, 3 and 4 which are seen to contact client company A. For example, for visitor Company 1, the system looks at a selected number of people from visitor Company 1, using cookies or unknown people mapped to the IP address of visitor Company 1, and as well as known contacts at visitor Company 1, and tracks events over time as described above, using the previously generated weighting model as well as the accumulated event data in order to calculate successive sales prediction scores. The same process is carried out for visitor Company 2, visitor Company 3, etc. The scores in FIGS. 3 to 6 are the combined or aggregated scores for all tracked visitors/contacts from the respective visitor Company 1, 2, 3 and 4. Spikes in the sales predicting scores are communicated to the client companies.

Figure 3:
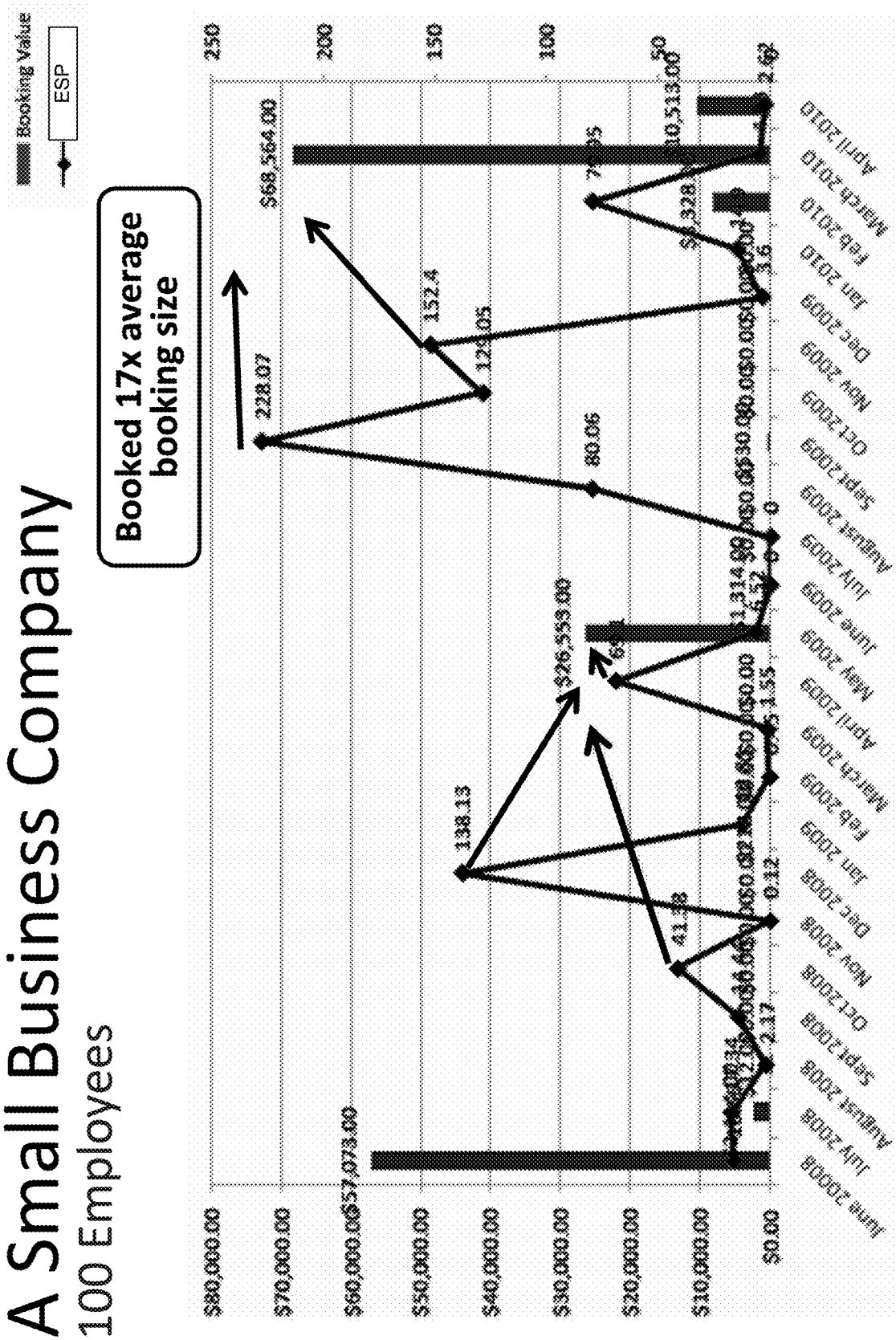
FIGS. 3 to 6 illustrate examples of sales prediction scores for several different potential customer companies (and the average score for all identified visitors of that company) of a client company using the system of FIGS. 1 and 2 to predict future sales, leads, and opportunities and obtain visitor based marketing information.
Figure 4:
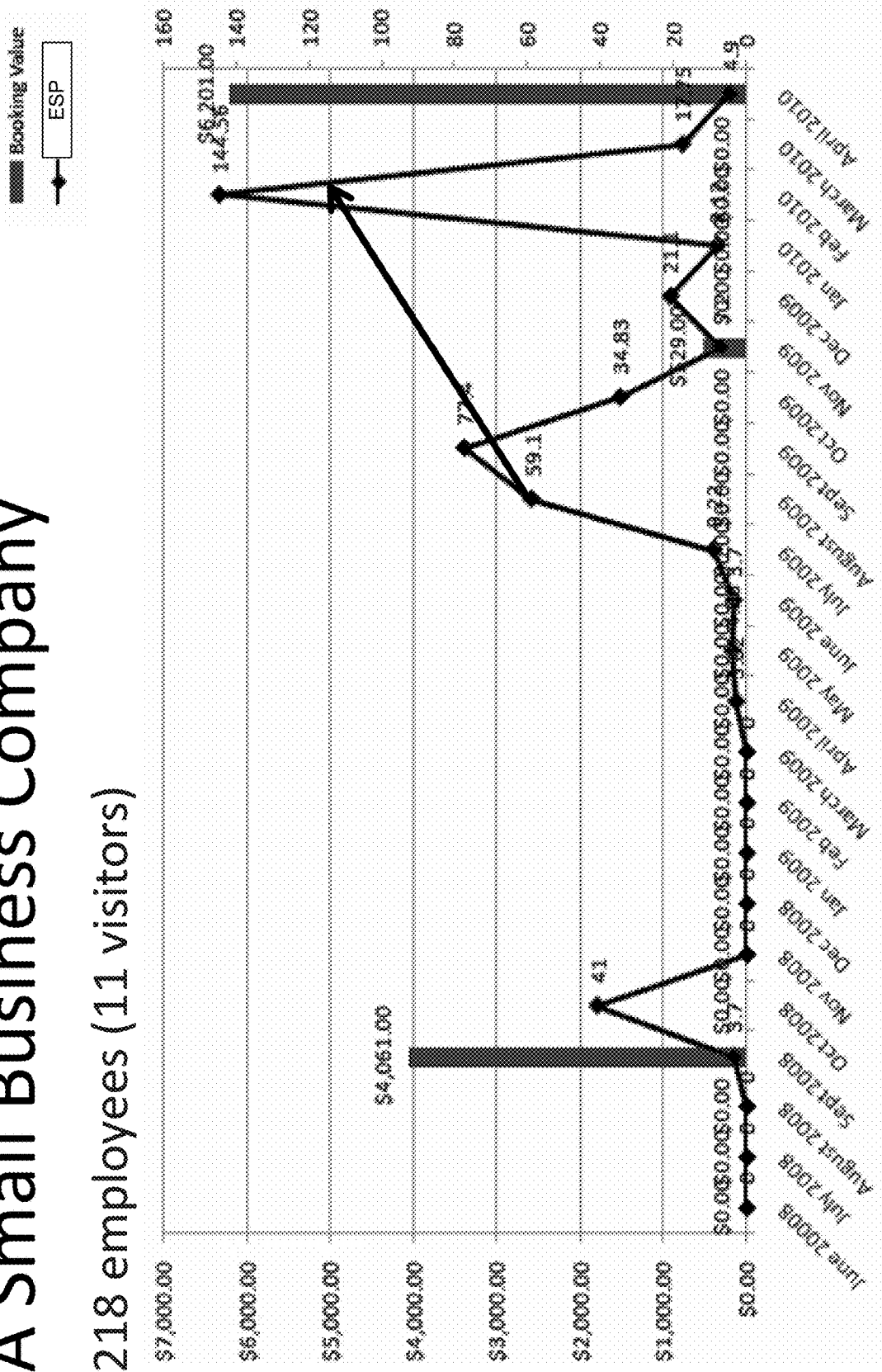
Figure 5:
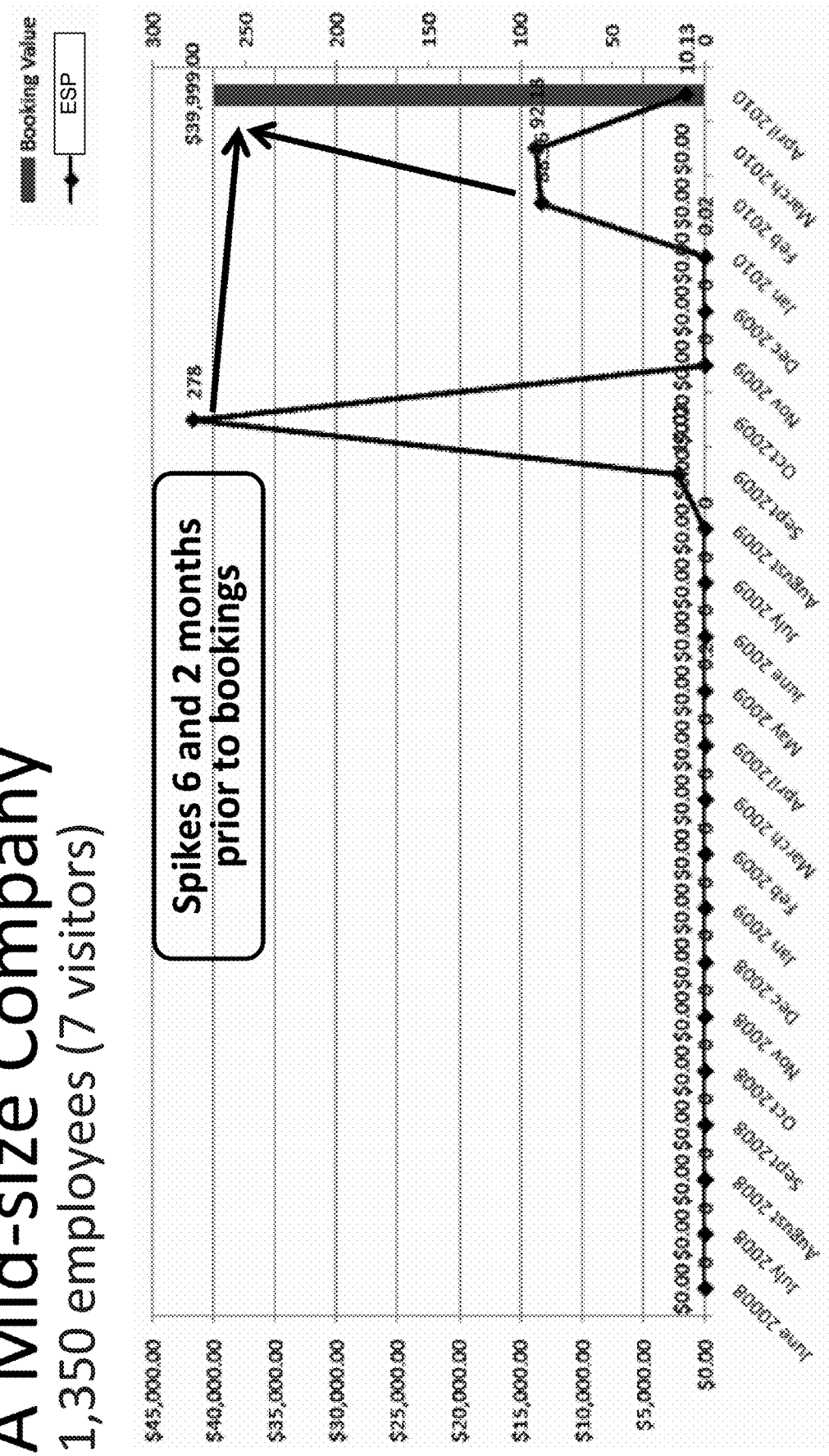
Figure 6:
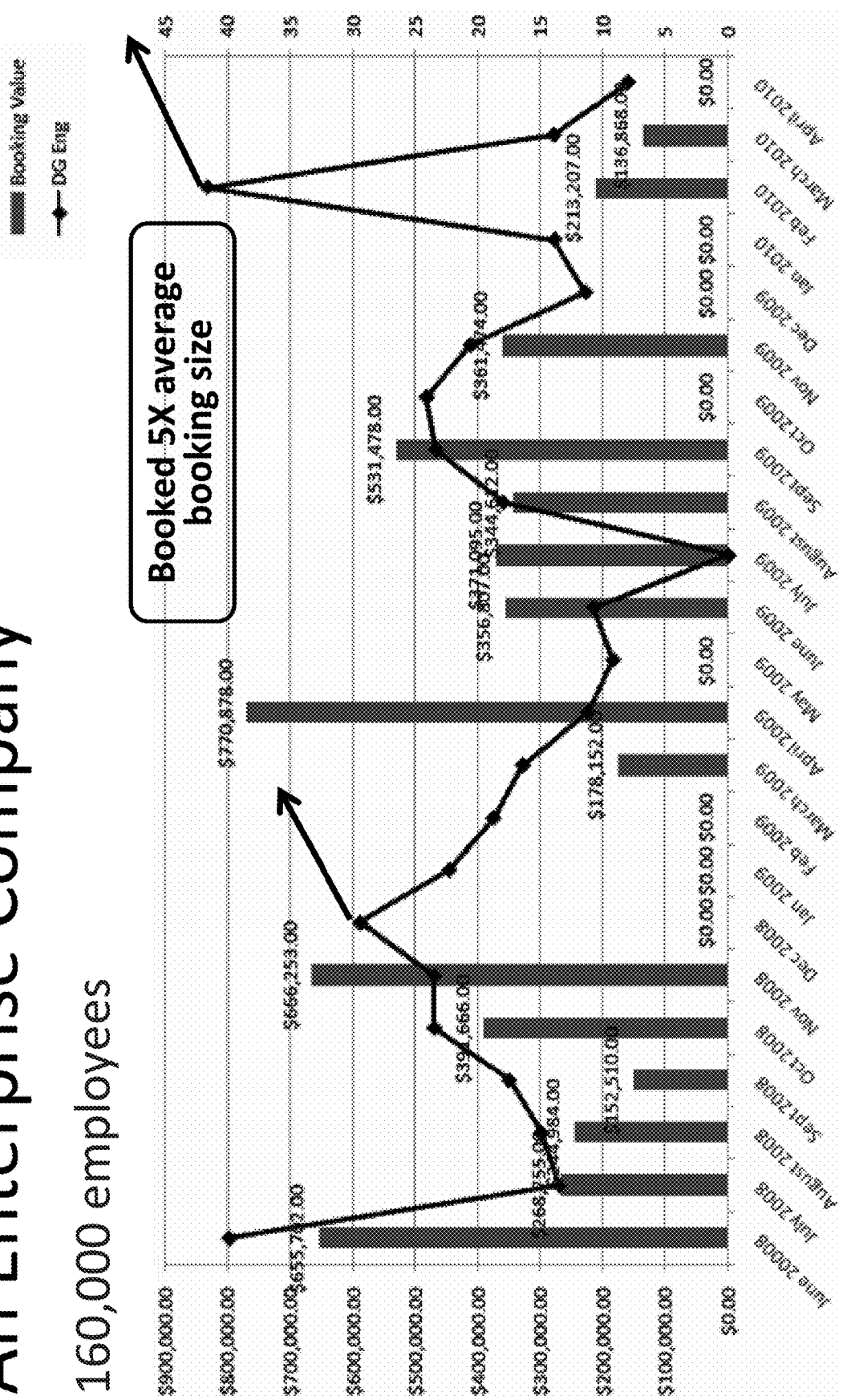

As illustrated in FIG. 3 for visitor Company 1, which is a small business with 100 employees, sales spikes of purchases of products or services from client company A occurred a few months after spikes in the calculated scores, as seen by the arrows between the spikes and subsequent purchases. The same sales prediction can be seen for visitor Company 2 (a small business with 218 employees) in FIG. 4, visitor Company 3 (a mid-size company with 1350 employees) in FIG. 5, and visitor Company 4 (a large enterprise with 160,000 employees) in FIG. 6. The largest spike in FIG. 3 was followed by a booking 17 times larger than the previous average booking for this visitor company.

The sales prediction value of this system and method has been shown by using the system to map historical activity to sales or bookings over a two year period, tracking a very large number of companies. In this period, the system was set up to monitor for booking or sales spikes in the nine months following a scoring spike indicating increased contact activity. With the score tracking graphs created as described above and illustrated in FIGS. 3 to 6, there are four possible outcomes:

1. No scoring spike—no booking spike.
2. Scoring spike—no booking spike following scoring spike.
3. Scoring spike—booking spike following scoring spike.
4. No scoring spike—booking spike.

Statistical analysis showed that, for a company with a minimum score of 50 and a spike of 10× or greater than the average score spike, 70% booked 5× or greater than average booking size. Of this group, 38% booked 20× or greater their average booking size. 27% booked at 50× or greater their average booking size.

Figure 7:
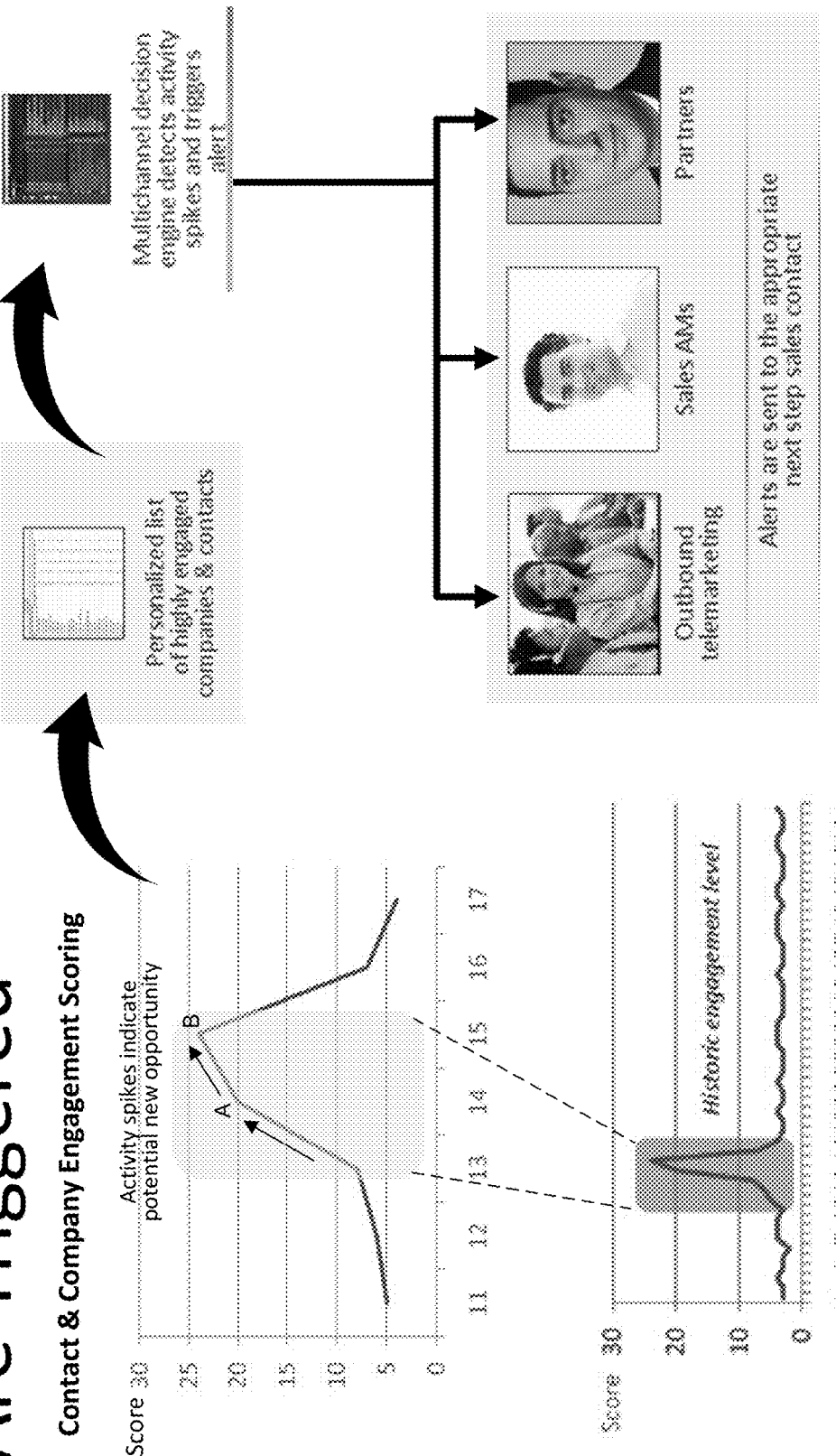
FIG. 7 illustrates a method of triggering sales alerts based on spikes in sales prediction scores.

This system and method can determine a company or individual's level of interest in a client company, what particular products or services they are interested in, the likelihood of purchase and when a purchase might occur, as well as how much might be purchased based on past purchase history. It also allows profiling of a client company's customers and prospective customers. This allows a client company using the sales prediction system described above to do better targeted marketing, for example based on sales prediction score triggers, personalized marketing based on detected product interests, and allows generation of leads and telemarketing lists of companies and individuals which have shown an interest in the client company's products or services. FIG. 7 illustrates one technique for triggering sales alerts. As illustrated in the graph in the lower left hand corner of FIG. 7, an activity spike or score spike indicates a potential new opportunity for the client company, and a decision engine detects such activity spikes and triggers an alert, which may include sending a personalized list of highly engaged contacts and companies to the appropriate next step sales contact, such as outbound telemarketing, sales assistant managers, and company partners.

This system can also be used to measure marketing effectiveness, such as the effectiveness of marketing mix, marketing attribution, campaigns of various types, website content, tools, features, innovations, and the like.

Companies already do "lead" scoring, but only after someone is a known contact. The system and method described above identifies contacts before they are known to the client company, and creates individual and company scores based on anonymous activity. In order to do this, the system maps IP addresses to companies using a lookup file of the type provided by vendors such as Demandbase, Inc., as described above.

This system and method does not just produce scores based on detected engagement, but instead builds predictive models based on records of activity. Engagement scoring could mean that a company is just looking for tech support, or something unrelated to buying. Most prior art scoring models use arbitrary weightings. They say they "think" X action should be scored with a given weight factor. The model created by the system and method described above specifically looks for the types of interactions that predict a sale. In order to build the weightings, the system takes data from customers that have purchased in the past and looks for what they do prior to buying. A predictive statistical model and weights are then created around the interactions that are found to have a statistical relationship to later buying, and this model is used to predict sales and provide new leads and sales opportunity information to a client company based on other individuals or companies exhibiting the same pattern of behavior.

Thus, when a new visitor or visitor company is found to demonstrate the same pattern of behavior, the model can predict they too are going to buy. The system looks at past interaction history, and if increasing by X % in their activity, the system predicts a purchase of X times higher than their past purchase history. For several client companies, this system has been statistically validated to predict future purchases with significant accuracy.

This model connects data from not just one source at a time but multiple sources of interactive data at the record/visitor level/company level. The system does not pre-aggregate any data. The predictions are based on interactions and provide an advance prediction of when a customer is going to purchase, how much is purchased, and what is purchased. Models can be built up over time to predict purchases on a customer specific basis, not compared to every prospective customer but based on that individual (or companies) past interactions. The predictive models are continuously updated based on newly detected scores and subsequent sales data for each detected visitor.

There are many "propensity to buy", "wallet share" etc models built by most corporate database marketing companies. These models use past purchase history, and are not based on current customer interactions, unlike the systems and method described above.

When the system identifies purchase intent, product interest is identified, and the information can then be sent to the client company for which the information was identified, and then used for a plethora of downstream sales and marketing activities, as illustrated in FIGS. 1 and 7. These activities may include, for example:

Personalizing the web experience—send to the company's CRM or other personalization tools;
Generate new leads/opportunities—send into CRM, and Marketing automation systems (salesforce)
Generate targeted telemarketing lists—the system generates lists which may be exported at the contact id level the generated product interest results may also be used as a universal benchmark measure of success for all marketing efforts (channel attribution models, campaign effectiveness, content, messaging etc)

the sales prediction scores generated as described below are also used to forecast company business, for example what products, verticals, geos, market segments are going up or down The sales prediction system and method described above uses statistical methods to determine what companies have purchased in the past and what actions they took prior to buying as a percentage of their overall actions. Actions having a stronger relationship to buying are weighted higher. Similar behavior patterns of other companies can then be used to predict future purchases by those companies with the same accuracy.

Figure 8:
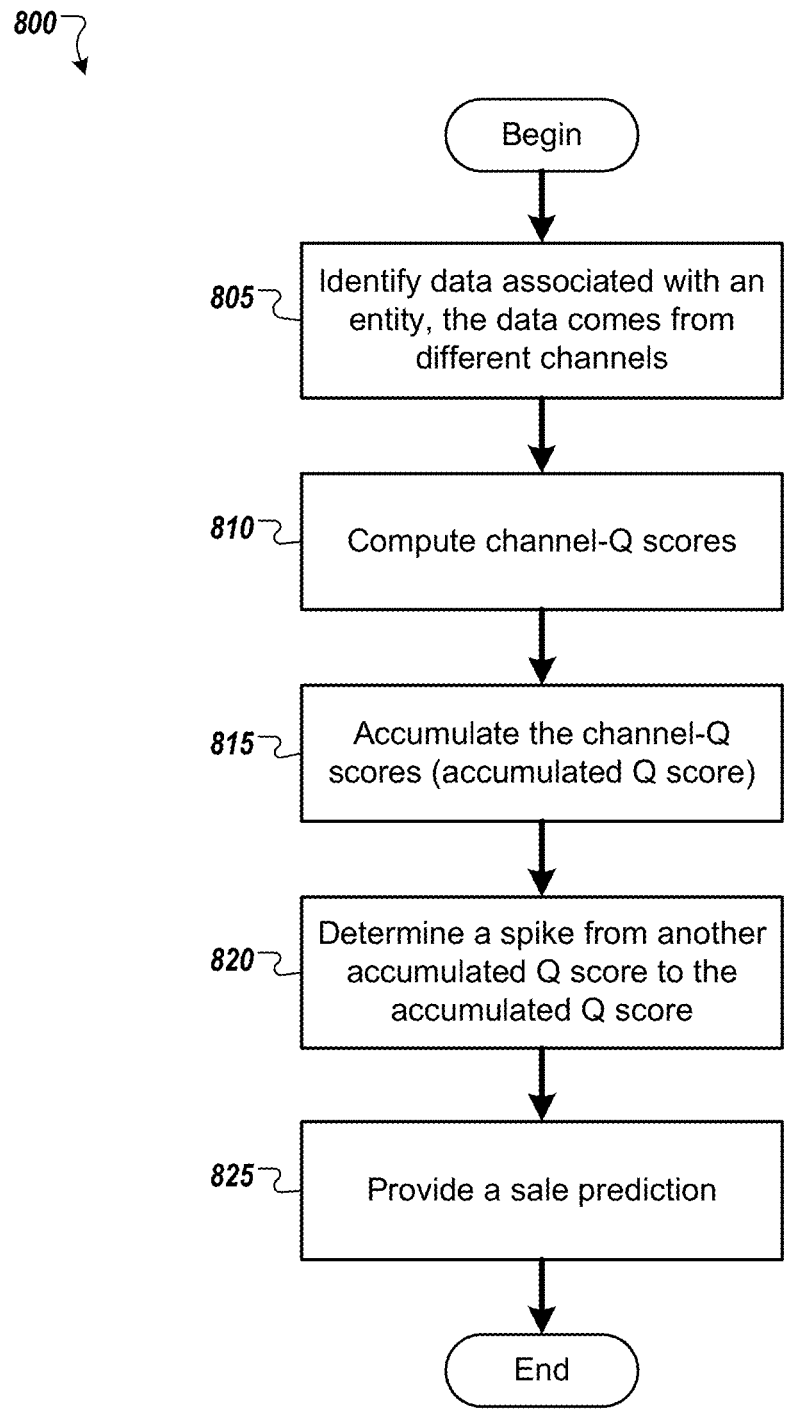
FIG. 8 shows an example of a process implementation.

FIG. 8 shows an example of a process implementation. Process 800 may start with block 805 where data produced within a time period and associated with an entity (e.g., an individual or company) is identified. The data may be collected from different sources or channels. Each collection or occurrence of an activity (e.g., a webpage visit, an email message, a text message, etc.) may be referred to as a "data page." At block 810, a channel-Q score or page-Q(p) score is computed for each of the channels of data. The channel-Q score may be an aggregate (e.g., an average) of the individual Q scores associated with the data pages of the channel (page-Q(p) score) using a formula as described above, as follows:

page-$Q(p)$ score=number of occurrences of data page($p$)×page weight($w$)

In some implementations, a recently occurred data page (detected visitor activity) within a certain time period prior to the computation of the channel-Q score may be counted more (e.g., twice or three times, etc.), as indicated in Table 2 above, using the following formula for counting each recent occurrence twice, for example:

page-$Q(p)$ score=[total number of occurrences of data page($p$)+number of recent occurrences of date page ($p$)]×page weight($w$)

In this way, recent occurrences are included both in the total number and the number of recent occurrences, and are thus counted twice. The recent occurrences may be multiplied by 2, for example, if they are to be given even more weight in the calculation.

At block 815, the channel-Q scores for two or more of the channels of data may be computed to produce, for example, an accumulated Q score. At block 820, the accumulated Q score may be analyzed with one or more previously computed accumulated Q scores (e.g., accumulated Q scores computed for different time periods) to determine a movement or trend, such as a spike. If a spike occurs (e.g., spike above a certain threshold), the spike may be provided and/or reported as a sale prediction. The sale prediction may be sent to one or more recipients in alerts (e.g., alert email messages, text messages, and/or voice messages).

In some examples, process 800 may be implemented with different, fewer, or more blocks. Process 800 may be implemented as computer executable instructions, which can be stored on a medium, loaded onto one or more processors of one or more computing devices, and executed as a computer-implemented method.

Process 800 is one example of a method of weighting accumulated data on visitor activities related to client companies in order to predict possible future sales and opportunities. Other methods of weighting may alternatively be used in other embodiments to perform the weighting and prediction, for example machine learning statistical methods such as but not limited to decision trees, logistic regression, and linear regression.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be hardware such as a microprocessor, or any processor, controller, or microcontroller, and the processing can be performed on a single piece of hardware or distributed across multiple servers or running on multiple computers that are housed in a local area or dispersed across different geographic locations. A processor can also be implemented as a combination of computing devices, for example, a combination of a DSP and a microprocessor, a plurality of microprocessors, one or more microprocessors in conjunction with a DSP core, or any other such configuration.

Figure 9:
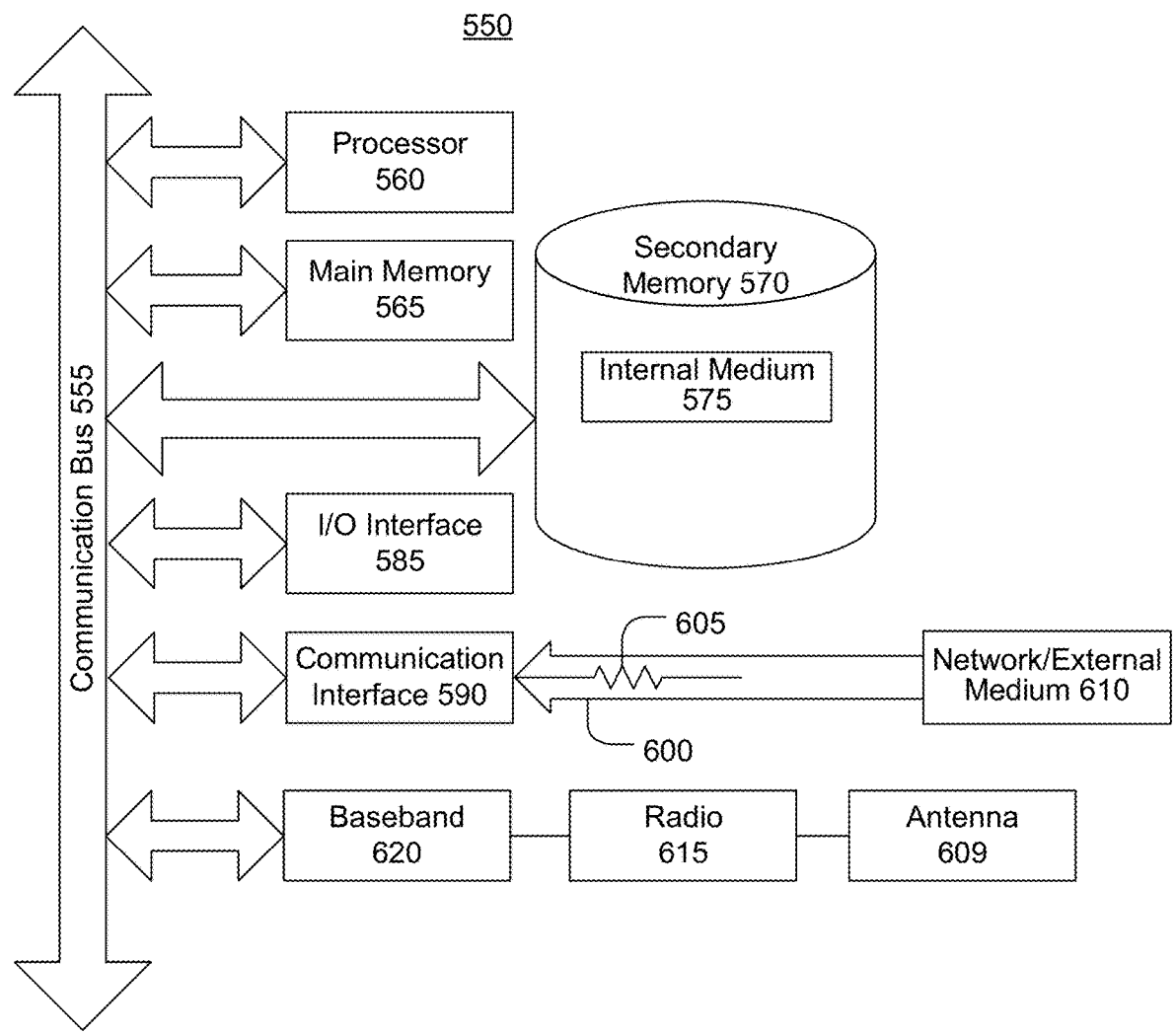
FIG. 9 is a block diagram illustrating an example processor based system that may be used in connection with various embodiments described herein.

FIG. 9 is a block diagram illustrating an example of a computer system 550 that may be used in connection with various embodiments described herein. For example, the computer system 550 may be used as the microprocessor or central processing unit 14 which receives the activity data and which uses that data and the created models for contacts to generate output sales prediction reports for client company customers or prospective customers, as well as marketing alerts or the like (consumption data), as described above. However, other computer systems and/or architectures may be used, as will be clear to those skilled in the art.

The computer system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the computer system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 565 and may also include a secondary memory 570. The main memory 565 provides storage of instructions and data in a computer readable medium for programs executing on the processor 560, such as the program modules described above in connection with FIGS. 1 and 2. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a hard disk drive 575 and/or a removable storage drive, for example a floppy disk drive, a magnetic tape drive, a compact disc ("CD") drive, a digital versatile disc ("DVD") drive, etc. The removable storage drive reads from and/or writes to a removable storage medium in a well-known manner. The removable storage medium may be, for example, a floppy disk, magnetic tape, CD, DVD, etc.

The removable storage medium is a non-transitory computer readable medium having stored thereon computer executable code (i.e., software) and/or data. The computer software or data stored on the removable storage medium is read into the computer system 550 as electrical communication signals for execution by the processor.

In alternative embodiments, secondary memory 570 may include other similar means for allowing computer programs or other data or instructions to be loaded into the computer system 550. Such means may include, for example, an external storage medium 610 and an interface 600. Examples of external storage medium 610 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units and interfaces, which allow software and data to be transferred from the removable storage unit to the computer system 550.

Computer system 550 may also include a communication interface 590. The communication interface 590 allows software and data to be transferred between computer system 550 and external devices (e.g. printers), networks, or information sources. For example, computer software or executable code may be transferred to computer system 550 from a network server via communication interface 590. Examples of communication interface 590 include a modem, a network interface card ("NIC"), a communications port, a PCMCIA slot and card, an infrared interface, and an IEEE 1394 fire-wire, just to name a few. Communication interface may also comprise Bluetooth or other wireless communication interface 34 of FIG. 3.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals are preferably provided to communication interface 590 via a communication channel 600. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the computer system 550 to perform the various functions of the embodiments described above.

In this description, the term "computer readable medium" is used to refer to any non-transitory computer readable storage media used to provide computer executable code (e.g., software and computer programs) to the computer system 550. Examples of these media include main memory 565, secondary memory 570 (including hard disk drive 575, removable storage medium, and external storage medium 610), and any peripheral device communicatively coupled with communication interface 590 (including a network information server or other network device). These non-transitory computer readable mediums are means for providing executable code, programming instructions, and software to the computer system 550.

In an embodiment that is implemented using software, the software may be stored on a computer readable medium and loaded into computer system 550 by way of removable storage drive 610, interface 585, or communication interface 590. In such an embodiment, the software is loaded into the computer system 550 in the form of electrical communication signals 605. The software, when executed by the processor 560, preferably causes the processor 560 to perform the features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The system 550 also includes optional wireless communication components that facilitate wireless communication over a voice and over a data network. The wireless communication components may comprise an antenna system 620, a radio system 615 and/or a baseband system 610. In the communication device 550, radio frequency ("RF") signals, if generated, are transmitted and received over the air by the antenna system 620 under the management of the radio system 615.

In one embodiment, the antenna system 620, if present, may comprise one or more antennae and one or more multiplexors (not shown) that perform a switching function to provide the antenna system 620 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communication over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 610.

The baseband system 610 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory, or executed upon receipt. Such computer programs, when executed, enable the computer system 550 to perform the various functions of the present invention as previously described. For example, data storage areas 565 may include various software modules (not shown) that perform the various functions of the present invention as previously described.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A method comprising using at least one hardware processor to:

for each of a plurality of anonymous visitors,
collect activity data representing activity of the anonymous visitor at one or more web sites, wherein the activity data comprises an Internet Protocol (IP) address or domain representing the anonymous visitor, wherein the activity data represents one or more events, and map the IP address or domain of the anonymous visitor to a company identifier of a known company using a lookup;

monitor a prediction score to detect a spike in the prediction score, wherein the spike is detected when a relative increase in the prediction score over prior prediction scores satisfies a threshold, wherein the prediction score represents one or both of a relative degree of interest from the known company in a product of a client company or a relative intent by the known company to purchase the product of the client company, and wherein the prediction score is calculated based on a plurality of events represented in the activity data for all of the plurality of anonymous visitors that have been mapped to the company identifier of the known company; and, in response to detecting the spike in the prediction score for the known company, identify the known company, whose company identifier has been mapped to the IP addresses or domains representing the plurality of anonymous visitors, to at least one recipient, wherein identifying the known company to at least one recipient comprises initiating an alert to one or more personnel of the client company that indicates that the one or more personnel should contact the known company.

2. The method of claim 1, wherein calculating the prediction score comprises weighting each of the plurality of events according to a predictive model.

3. The method of claim 2, wherein the predictive model defines weightings for at least one of the plurality of events based on a likelihood of the at least one event to precede a purchase.

4. The method of claim 2, wherein the predictive model weights one or more types of the plurality of events differently than other types of the plurality of events.

5. The method of claim 1, wherein, during calculation of the prediction score, more recent ones of the plurality of events are weighted higher than less recent ones of the plurality of events.

6. The method of claim 1, wherein the at least one recipient comprises one or both of a customer relationship management system and a marketing automation system.

7. The method of claim 1, wherein identifying the known company to at least one recipient comprises adding contact information, associated with the known company, to at least one telemarketing list.

8. The method of claim 1, wherein the plurality of events comprises visits to one or more webpages of the one or more websites.

9. The method of claim 1, wherein the plurality of events comprises one or more searches performed on the one or more websites.

10. The method of claim 1, wherein the plurality of events comprises one or more click events.

11. The method of claim 10, wherein at least one of the one or more click events comprises selecting an online advertisement.

12. The method of claim 1, wherein the plurality of events comprises filling out one or more online forms.

13. The method of claim 1, wherein the plurality of events comprises one or more price requests.

14. The method of claim 1, wherein the plurality of events comprises one or more downloads of an electronic document.

15. The method of claim 1, wherein the plurality of events comprises one or more interactions with an email offer.

16. The method of claim 15, wherein the one or more interactions comprise one or more of opening an email offer or responding to an email offer.

17. The method of claim 1, further comprising using the at least one hardware processor to store the activity data in association with the contact identifier without aggregating the plurality of events.

18. A system comprising:
   at least one hardware processor; and
   at least one memory storing one or more software modules, wherein the one or more software modules are configured to, when executed by the at least one hardware processor,
      for each of a plurality of anonymous visitors, collect activity data representing activity of the anonymous visitor at least one website, wherein the activity data comprises an Internet Protocol (IP) address or domain representing the anonymous visitor, wherein the activity data represents one or more events, and
      map the IP address or domain of the anonymous visitor to a company identifier of a known company using a lookup,
      monitor a prediction score to detect a spike in the prediction score, wherein the spike is detected when a relative increase in the prediction score over prior prediction scores satisfies a threshold, wherein the prediction score represents one or both of a relative degree of interest from the known company in a product of a client company or a relative intent by the known company to purchase the product of the client company, and wherein the prediction score is calculated based on a plurality of events represented in the activity data for all of the plurality of anonymous visitors that have been mapped to the company identifier of the known company, and,
      in response to detecting the spike in the prediction score for the known company, identify the known company, whose company identifier has been mapped to the IP addresses or domains representing the plurality of anonymous visitors, to at least one recipient, wherein identifying the known company to at least one recipient comprises initiating an alert to one or more personnel of the client company that indicates that the one or more personnel should contact the known company.

19. A non-transitory computer-readable medium having instructions stored thereon, wherein the instructions, when executed by a processor, cause the processor to:
   for each of a plurality of anonymous visitors,
      collect activity data representing activity of the anonymous visitor at at least one website, wherein the activity data comprises an Internet Protocol (IP) address or domain representing the anonymous visitor, wherein the activity data represents one or more events, and
      map the IP address or domain of the anonymous visitor to a company identifier of a known company using a lookup;
   monitor a prediction score to detect a spike in the prediction score, wherein the spike is detected when a relative increase in the prediction score over prior prediction scores satisfies a threshold, wherein the prediction score represents one or both of a relative degree of interest from the known company in a product of a client company or a relative intent by the known company to purchase the product of the client company, and wherein the prediction score is calculated based on a plurality of events represented in the activity data for all of the plurality of anonymous visitors that have been mapped to the company identifier of the known company; and,
   in response to detecting the spike in the prediction score for the known company, identify the known company, whose company identifier has been mapped to the IP addresses or domains representing the plurality of anonymous visitors, to at least one recipient, wherein identifying the known company to at least one recipient comprises initiating an alert to one or more personnel of the client company that indicates that the one or more personnel should contact the known company.

* * * * *